Aug. 16, 1927.
W. R. BADGER
1,639,626
DENTAL ARTICULATOR
Filed Sept. 4, 1925
3 Sheets-Sheet 1
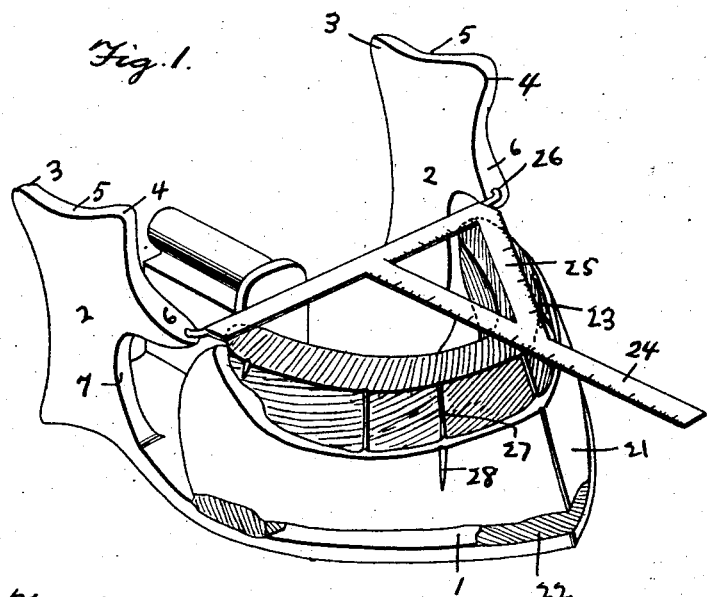
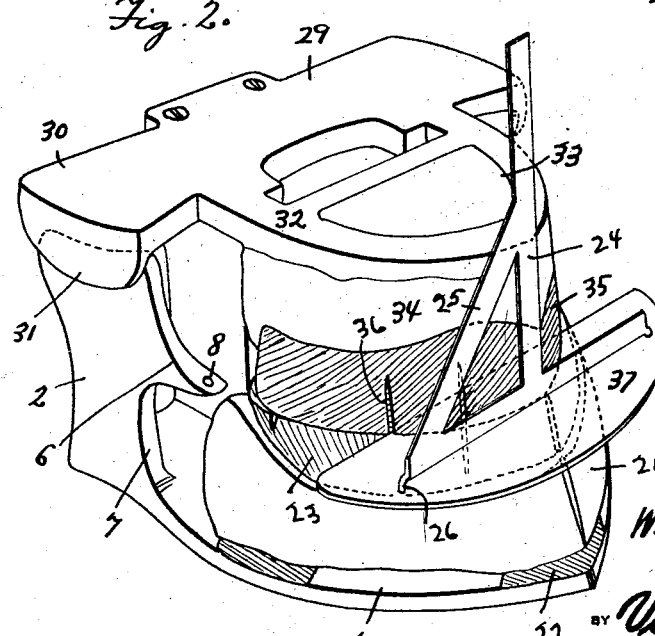
William R. Badger
INVENTOR
BY Victor J. Evans
ATTORNEY
WITNESS: Gerald Hennesy Aug. 16, 1927.

W. R. BADGER 1,639,626

DENTAL ARTICULATOR

Filed Sept. 4, 1925

William R. Badger
INVENTOR

BY Victor J. Evans
ATTORNEY

WITNESS: Gerald Hennesy

Aug. 16, 1927.

W. R. BADGER 1,639,626

DENTAL ARTICULATOR

Filed Sept. 4, 1925    3 Sheets-Sheet 3

William R. Badger
INVENTOR

BY Victor J. Evans
ATTORNEY

WITNESS: Gerald Hennessy

Patented Aug. 16, 1927.

1,639,626

UNITED STATES PATENT OFFICE.

WILLIAM R. BADGER, OF HUBBARD, OHIO.

DENTAL ARTICULATOR.

Application filed September 4, 1925. Serial No. 54,526.

An object of this invention is to simplify and improve the existing constructions of dental articulators.

A further object is the provision of an apparatus for obtaining the correct articulation of artificial teeth by accurate measurements obtained from the mouth of the patient so that the proper sets of such teeth may be made regardless of the irregularities of the jaw formation of the patient.

A further and important object is the provision of an apparatus for this purpose which comprises two members shaped to correspond to the upper and lower jaw bones of a human being and associated in a manner corresponding to the muscular connection of such human bones and whereby measurements taken from the mouth of the patient may be accurately conveyed to foundations and trial plates arranged upon the apparatus.

A further object is the provision of an apparatus for this purpose designed to have molded thereon plastic foundations, corresponding by accurate measurements to the shape, size and formation to the upper and lower gums of the patient, the said foundations providing rests or supports for wax trial plates which have been roughly shaped in the mouth of the patient and accurately shaped when arranged on the foundations, thereafter forwarded to the laboratory for the insertion of the teeth and returned and again placed on the foundations and ground to provide the proper bite between the upper and lower sets of teeth.

A still further object is the provision of an apparatus for this purpose, comprising two removably associated members shaped to correspond to the general contour of the inferior maxillary or lower jaw bone and to the superior maxillary or upper jaw bone of a human being, whereby measurements taken from the mouth of the patient and marked on a card system will permit the operator building up on the apparatus foundations for wax trial plates which are shaped to correspond to the bite of the teeth of the patient and after having teeth inserted therein ground and again arranged on the foundations and ground against each other by the manipulation of the members constituting the apparatus.

A still further object is the provision of an apparatus for this purpose, comprising separable members shaped respectively to correspond to the shape of the upper and lower jaws of a human being and adapted when separated to have molded thereon foundations for the reception of wax trial plates whose impressions have been made from the mouth of the patient, said trial plates and foundations having aligning marks made from measurements taken from the mouth of the patient so that the trial plates, after the teeth have been inserted therein, may be accurately positioned upon the foundations and ground by the operator, and wherein the elements constituting the means for connecting the members are such as to prevent the wabbling therebetween and also such as to permit of the longitudinal, side or lateral movement of the members to degrees corresponding to such movement of the lower jaw of the patient.

A still further object is the provision of an apparatus for this purpose, whereby artificial teeth may be produced in a manner whereby the same, when fitted in the mouth of the patient, will insure correct bite and articulation of said teeth and will prevent the unbalancing engagement of the condyloid and coronoid extensions on the ramus or perpendicular portions of the lower jaw, such balancing frequently resulting in the pressure of the condyloid against the ear drum which renders the hearing of the patient defective and sometimes entirely destroys the sense of hearing.

A still further object is the provision of an apparatus of this character which is of a comparatively simple construction and by whose use important and desirable results may be accurately obtained.

To the attainment of the foregoing and other objects which will present themselves as the nature of the invention is better understood, reference being had to the drawings which accompany and form part of this application.

In the drawings:—

Figure 1 is a perspective view of the lower member of the improvement, having a plastic foundation and a wax trial plate thereon and illustrating the manner whereby measurements taken from the mouth of a patient may be conveyed to the trial plate and foundation.

Figure 2 is a perspective view of the complete apparatus, showing the manner in which the height of the upper gum of a patient may be conveyed to the apparatus.

Figure 3:
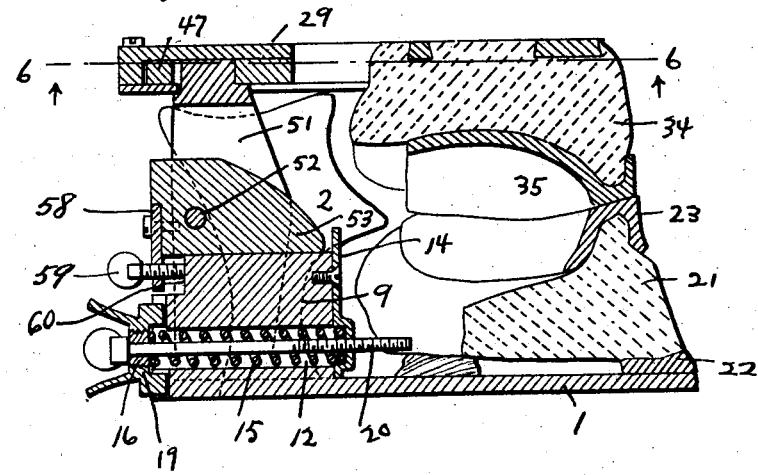
Figure 3 is an approximately central vertical longitudinal sectional view through the improvement.
Figure 4:
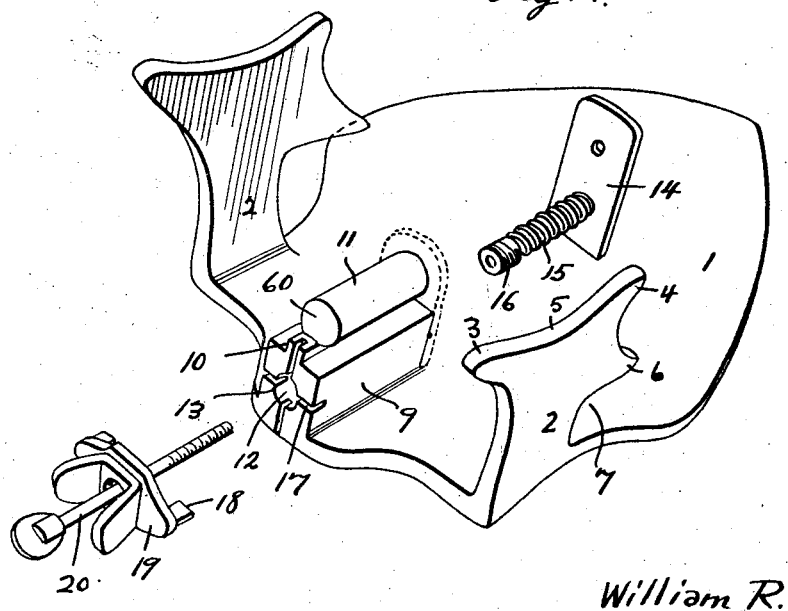
Figure 4 is a perspective view of the lower member of the improvement with parts separated.
Figure 5:
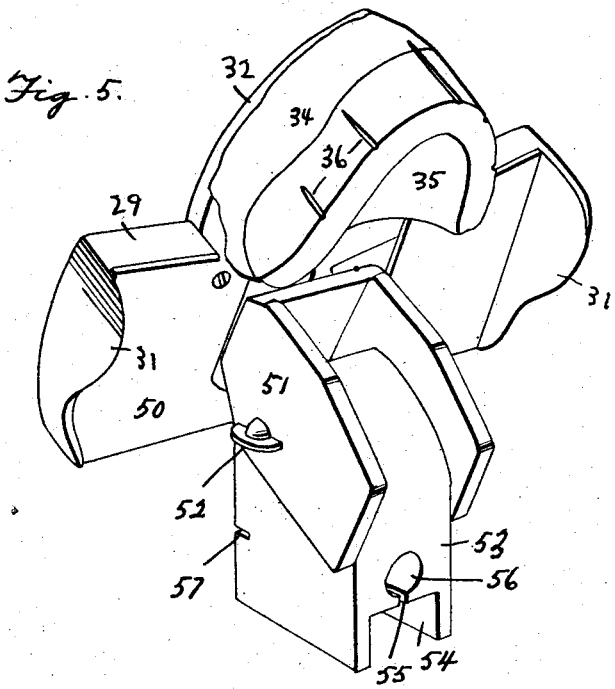
Figure 5 is a perspective view of the upper member of the improvement, showing the same swung on its support.
Figure 6:
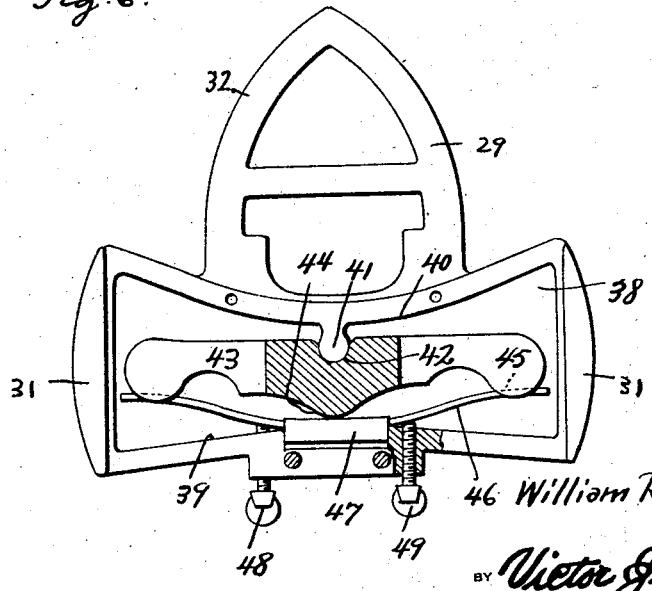
Figure 6 is a sectional view approximately on the line 6—6 of Figure 3.

Before describing my improvement in detail it may be well to state that I employ a card system upon which I mark measurements taken from the mouth of a patient, and employ these measurements in building up the foundations and the trial plates so that liability of inaccuracy in the construction of such foundations and trial plates is positively overcome.

As disclosed by the drawings my improvement essentially contemplates two members designed to be removably associated in a particular and novel manner. Each of these members corresponds in shape to the superior maxillary bone and to the lower or inferior maxillary bone of the human skull. The malar and zygoma bone constructions are particularly represented in the upper member, while the rami or perpendicular portions of the quadri lateral form of the lower jaw bone and especially the protrusions representing the condyloid, coronoid projections and the sigmoid notch between the projections are represented by the lower member.

The lower member includes a flat base or body 1 which is rounded from its sides to its center, and the perpendicular projections, representing the ramus of the lower jaw are indicated by the numerals 2. The projections 2 have their corners formed with rounded extensions 3 and 4, corresponding to the shape of the condyloid and coronoid extensions of the ramus and the sigmoid notch 5 therebetween. The perpendicular projections or flanges 2 on their outer edges, are centrally formed with extensions 6, and the notched portions below the extensions are indicated for distinction by the numeral 7. Each of the extensions has a longitudinal slot 8 entering from the outer face thereof.

The rear of the base or body 1 is formed with a central construction and on the said body, in align with the said extension, there is an upstanding block 9. This block has its top centrally formed with a longitudinally extending rib 10, and the rib has its outer face formed with a longitudinally extending cross sectionally rounded portion in the nature of a rail 11. The rail terminates a slight but suitable distance from the rear of the block 9.

The block 9 has a central rounded opening 12 therethrough, and the outer face of the block, including the rail 11, is contacted by a removable plate 14 which is preferably attached to the rail 11 by a screw or the like. The plate 14 carries a boss that provides a support for a helical spring 15, the outer end of the spring having secured therein an exteriorly threaded sleeve 16. The boss on the plate 14 extends both inwardly and outwardly therefrom and has a threaded opening therethrough. The block 9, central of its bore, is provided with rightangularly disposed notches 17, two of the aligning notches designed to be engaged by lugs 18 on a cap or finger member 19 that is threadedly associated with the sleeve 16. There is centrally passed through the member 19 and through the sleeve 16, the shank of a headed bolt 20. The threads of this bolt engage the threads in the bore of the boss on the plate 14. The member 19 is of a length greater than the width of the block 9, so that when the lugs 18 are received in the horizontal notches 17 in the block, the said member 19 will be extended beyond the sides of the said block 9. When the member is drawn outwardly against the tension of the spring 15 and its lugs 18 are arranged in the vertical notches 17, the width of the said member will be less than that of the block. The purpose for the block construction and the elements associated therewith will presently be set forth.

As previously stated, the base 1 is shaped to correspond with the lower bone of the human jaw with the muscles removed.

The outer portion of the base or body 1 is designed to receive on the upper face thereof, a foundation 21 molded from plaster Paris or the like. The foundation is secured to the base or body by melted wax wafers 22. The height of the foundation, throughout, is obtained by accurate measurements of the lower gum or of the flesh portion between the teeth, covered by the maxillary bone of the patient. As these measurements are accurate all irregularities in the lower jaw bone of the patient will be effectively compensated for. I also make use of what I term a trial plate which is formed of wax. This I arrange in the mouth of the patient to obtain an impression of the lower gum. When this impression is made I arrange the wax trial plate 23 on the top of the foundation 21, shaping the said top of the foundation to correspond with the concaved inner surface of the trial plate. I also obtain by a suitable rule, the exact distance of the various parts of the gum of the patient and mark these measurements upon a card which is included in my system. These measurements are taken from the outer edge of the rami of the patient, and as the rami corresponds in shape to the vertical extensions or flanges 2 on the base 1, similar measurements may be made therefrom. In this manner, and without any resort to guess work, both the foundation and the trial plate will be constructed to properly correspond to the lower jaw formation of the patient. As disclosed by Figure 1 of the drawings, I make use of a measure which, of course, corresponds to the rule or measure employed in the patient's mouth. The measure is in the nature of a T-square 24 but has an angle branch 25. The head of the T-square has hingedly secured thereto outstanding angularly arranged fingers 26, and these fingers are designed to be received in the openings 8 at the front projections 6 on the flanges 2. By the use of an instrument as above described, every part of the inner and outer surfaces of the trial plate may be accurately marked and the said trial plate shaved or otherwise shaped to correspond to said measurements. When the trial plate has its said surfaces properly shaped, the outer face thereof may be and preferably is provided with slight indentures 27, certain of which correspond with similar indentures 28 on the outer face of the foundation 21. The upper face of the trial plate is also properly shaped by vertical measurements. The aligning notches 27 and 28 insure the trial plate being properly arranged on the foundation when the same is returned from the laboratory with the teeth inserted therein. However, the trial plate is permitted to remain on the foundation when the trial plate for the upper set of teeth is formed on the upper member 29 of the apparatus. As previously stated, the upper member 29 is shaped to correspond to the shape of the upper jaw portion of a human being. The member 29 includes a flat rear portion 30 whose ends are formed with downwardly directed guide flanges 31. The inner face of the guide plate, adjacent to the said flanges 31, may and preferably is shaped to correspond with the zygoma bones of the human body, and these bones rest upon the projections 3 and 4 on the flanges 2 of the base whereby a rocking motion between the members 1 and 29 of the improvement may be obtained as well as a lateral motion between these members, such motions corresponding to the movement of the jaws during the opening and closing thereof and also corresponding to any side or lateral movement of the lower jaw with respect to the upper jaw.

The forward or outer end of the member 29 is reduced and has its sides rounded to its center. For distinction this portion is indicated by the numeral 32 and the same is preferably provided with spaced openings 33 in which the base of the upper foundation 34 is embedded. Measurements for obtaining the exact size and shape of the upper foundation 34 are obtained in a manner similar to that previously described, and the trial plate 35 and the said upper base 34 are also formed and shaped in a manner as previously described. The upper trial plate 34 is preferably provided with spaced depressions 36 in align with the depressions in the lower trial plate. To assist in obtaining the vertical measurements for the upper foundation, I preferably arrange between the upper and lower trial plates a metal segmental member 37 that has spaced openings therein for the reception of the fingers of the measuring device 24.

After the trial plates have been shaped and formed they may be hingedly but removably connected and again inserted in the mouth of the patient to insure the operator that the proper bite between the plates has been obtained. The trial plates are then, as previously intimated, sent to the laboratory for the insertion of the teeth therein and after their return are again placed on the foundations.

The upper and lower members 1 and 29 are connected together in a manner corresponding, as far as mechanical contrivances will permit, to the muscular connection between such human bones. To accomplish this I form the under face, at the widened portion 30 of the upper member 29, with an elongated pocket 38. The rear wall of this pocket is slightly arched inwardly, as indicated by the numeral 39, but the outer wall of the pocket is struck inwardly at a determined curvature, as indicated by the numeral 40. The curved wall 40 is centrally formed with an inwardly extending cross sectionally rounded knob 41. This knob is seated in a rounded depression 42 formed in the central portion of a bar 43. The opposite outer and central edge of the bar is formed with a rounded protrusion 44 and the ends of said bar have their outer corners rounded outwardly and notched, as at 45. The notches 45 receive therein the ends of an arched spring 46, the center of the said spring having secured thereon a block 47. This block is in contact with the protrusion 44. The spring 46, at the portions thereof, to the sides of the block 47, is contacted by the shanks of headed screw members 48 and 49, respectively. The knob 41 is in the nature of a fulcrum member and by adjusting the tension on either of the arms of the spring 46 the upper member 29 of the improvement may be arranged at a desired angle, and locked in such position by tensioning both of the springs to force the block 47 into contact with the protrusion 44 and to likewise force the wall provided by the opening 42 into frictional engagement with the knob 41.

A suitable plate 50 closes the pocket 38, the said plate being removably secured to the member 29 by screws or the like. Attached to the bar 43 and passing through an opening in the center of the plate 50 there is a yoke member 51. Pivotally secured, by binding means 52, between the arms of the yoke 51, there is a block 53. The block has its outer end channeled longitudinally, as at 54. The upper wall provided by the channel 54 has a longitudinal slot 55 therethrough, and this slot communicated with a round opening 56 in the said block. The opening 56 is designed to receive therein the rail 11 on the member 1, and the notch or slot 55 receives therethrough the rib 10 on the block 9 of the said member 1. The arms provided on the sides of the block 53, by the channel 54, are disposed over the sides of the block 9. The block 53 is limited in its inward movement on the block 9 by contacting engagement of the plate 14 therewith and is limited in its outward movement by contact with the ends of the element 19, when the latter is arranged transversely with respect to the block 9. The block 53 may be inserted over the block 9 when the member 51 is arranged on the block in vertical position, and the said member 19 is then drawn outwardly against the pressure of the spring 15 and turned rightangularly to permit of its lugs 18 entering notches 57 in the outer face of the block 53. By adjusting the screw 20 the spring 15 is tensioned so that the rearward movement of the block 53 on the block 9 will be limited. As stated, the plate 14 limits the inward movement of the block 53, but as it is essential that the degree of such movement be accurately determined or regulated, I fix on the outer face of the block 53 a plate 58, (Figure 3). Screwed through this plate 58 there is the shank of a headed bolt 59 and this bolt contacts with the shoulder 60 provided on the outer end of the rail 11.

The limit of the longitudinal, as well as the lateral movement of the lower jaw of the patient is previously ascertained, and the bolts or screws 20 and 59 are adjusted to permit of the body members 1 and 29 of the improvement moving longitudinally only to such determined degree while the bolts 48 and 49 are adjusted to permit of the lateral swinging movement of the body member 29 over the body member 1. Thus, by the employment of a construction as above described, for connecting the body members 1 and 29, the movement permitted by the connecting muscles between the upper and lower jaw members of a human being is accurately obtained by my device. Also the connection properly arranges the projecting corners 3 and 4 on the flanges 2 of the body 1 with respect to the plate 30 of the body member 29 so that the teeth when ground and fitted in the mouth of the patient will bite in a natural manner which will obviate the liability of improper cooperation between the upper and lower jaw bones, which frequently causes the rami of the lower jaw bone to press against the ear drum and results in the partial or entire deafness of the patient.

When the plates having the teeth therein are again arranged upon the foundations a proper grinding solution is placed between the upper and lower teeth, and the operator grasping both the upper and lower body members moves the same both longitudinally and laterally to effectively grind the teeth to insure a proper bite between the teeth.

My construction and its advantages will, it is believed, be fully understood and appreciated by those skilled in the art to which this invention relates when the foregoing description is carefully read in connection with the accompanying drawings. The nature of the invention is such as to necessarily render the same susceptible to changes and modifications and therefore it is to be understood that the illustrative description herein set forth merely refers to a satisfactory embodiment of the improvement and that I am entitled to such changes therefrom as fairly fall within the scope of the appended claims.

Having described the invention, I claim:—

1. A dental apparatus for the purpose set forth, comprising a lower body member and an upper overlying body member, said lower member having its sides rounded to the center thereof, and its said sides at the rear thereof formed with extensions whose outer corners are rounded and whose inner edges are formed with approximately central extensions, the upper body member having its rear portion extended laterally and its outer portion rounded from the sides to the center thereof, said lateral extensions designed to rest upon the rounded corners of the first mentioned extensions and being formed with guide flanges which project over the sides of the said first mentioned extensions, means for removably connecting the rear portions of the bodies, said means including slidable cooperating blocks, spring means influencing the block of one of the members in one direction over the block of the other member, adjustable means for limiting such sliding movement in both directions, a hinged connection between one of said blocks and one of said members, and means between said hinged connection and said body member permitting a lateral adjustment of said body member and a limited lateral movement of said body member after such adjustment.

2. A dental apparatus for the purpose set forth, comprising a lower flat body member, whose sides are rounded to the outer center thereof, and whose said sides, at the rear thereof, have upwardly extending flanges whose outer corners are rounded and whose inner edges are formed with substantially central extensions, a block fixed centrally on the rear of said member, a rail on the upper face of said block and an upper member having the under face of its rear portion resting on the rounded corners of the flanges of the lower member and having depending flanges providing guides disposed in close proximity to the outer faces of said flanges, said upper member having its body portion rounded forwardly from its sides to its center and having openings through said body portion, a fulcrumed plate pocketed in the rear of the upper body member, an arched spring contacting the ends of the bar, an element centrally secured on said spring for contacting the center of the bar, adjustable means engaging the arms of the spring for swinging the body member laterally on the bar, and for likewise further compressing the arms of the spring to lock said body member when laterally adjusted, a depending yoke member connected to the bar and projecting through the body member, a block straddled by said yoke member and frictionally pivoted thereon, said block having a bifurcated lower end and having a passage therethrough to receive the rail of the first mentioned block, adjustable spring means carried by the first mentioned block and engageable with the last mentioned block for limiting the longitudinal movement of said last mentioned block on the first mentioned block, and adjustable means carried by the last mentioned block engageable with the rail of the first mentioned block for limiting the longitudinal movement of the last mentioned block in the second direction.

In testimony whereof I affix my signature.

WILLIAM R. BADGER.